United States Patent
Maley et al.

(10) Patent No.: US 7,078,837 B1
(45) Date of Patent: Jul. 18, 2006

(54) METHOD AND APPARATUS FOR CONTAMINATION PROTECTION FOR BEARING ASSEMBLY

(75) Inventors: David Maley, Anderson, IN (US); Jorge Silva, Anderson, IN (US)

(73) Assignee: Remy International, Inc., Anderson, IN (US)

( * ) Notice: Subject to any disclaimer, the term of this patent is extended or adjusted under 35 U.S.C. 154(b) by 0 days.

(21) Appl. No.: 11/046,400

(22) Filed: Jan. 28, 2005

(51) Int. Cl.
*H02K 7/08* (2006.01)

(52) U.S. Cl. .................................. 310/90; 384/478
(58) Field of Classification Search ............... 310/90
See application file for complete search history.

(56) References Cited

U.S. PATENT DOCUMENTS

| | | | | |
|---|---|---|---|---|
| 4,361,774 A | * | 11/1982 | Czech .................... | 310/90 |
| 4,373,759 A | * | 2/1983 | Greener et al. .......... | 384/480 |
| 4,716,327 A | * | 12/1987 | Stone ..................... | 310/90 |
| 4,972,939 A | * | 11/1990 | Uttke et al. ............. | 198/501 |
| 5,025,917 A | * | 6/1991 | Smith et al. ............. | 198/842 |
| 5,261,528 A | * | 11/1993 | Bouchal .................. | 198/842 |
| 5,336,955 A | * | 8/1994 | Suzuki et al. ........... | 310/90 |
| 5,666,219 A | * | 9/1997 | Ishizuka et al. ......... | 359/200 |
| 6,670,733 B1 | * | 12/2003 | Melfi ..................... | 310/68 R |

FOREIGN PATENT DOCUMENTS

| | | | |
|---|---|---|---|
| EP | 0059270 | * | 9/1982 |
| EP | 579303 | * | 1/1994 |
| JP | 04-00230 | * | 1/1992 |

* cited by examiner

*Primary Examiner*—Burton Mullins
(74) *Attorney, Agent, or Firm*—Cantor Colburn LLP

(57) ABSTRACT

A bearing assembly includes a bearing housing; a rotatable shaft extending through the bearing housing; a bearing having an outer race and an inner race with a bearing seal therebetween, the outer race operably coupled to the bearing housing and the inner race operably coupled to the rotatable shaft; and a slinger operably coupled to an outside edge defining the inner race and rotatable therewith while an external periphery defining the slinger is disposed within a groove configured in the housing, wherein the slinger protects the bearing from contamination from the elements while freely spinning absent contact with the housing, the outer race, and the bearing seal.

17 Claims, 3 Drawing Sheets

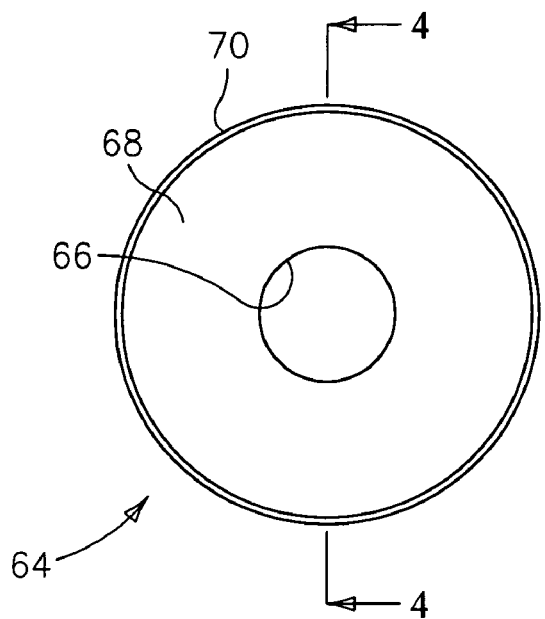
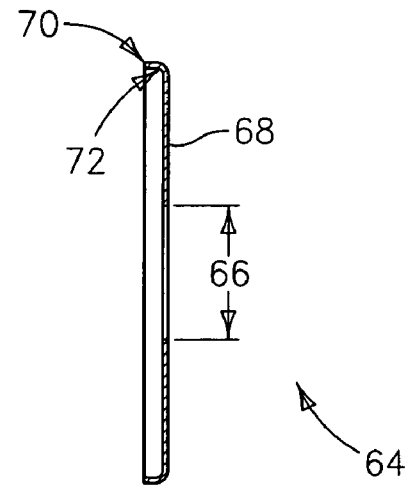
FIG. 3   FIG. 4
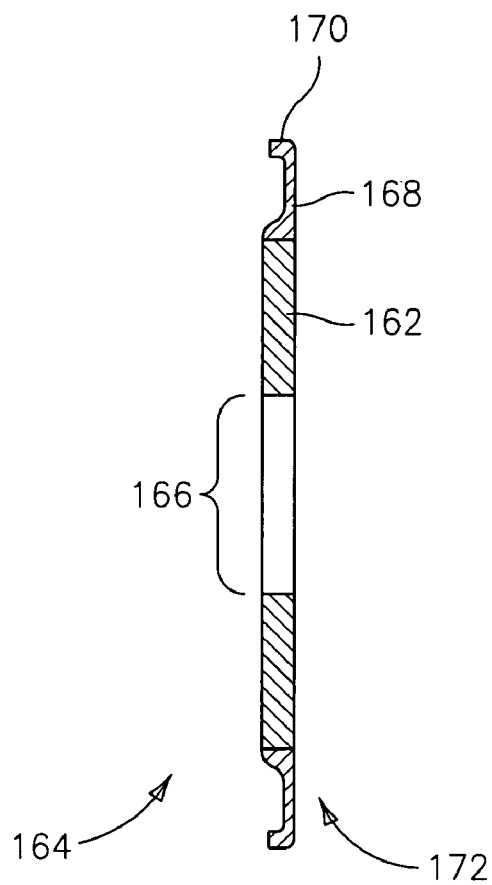
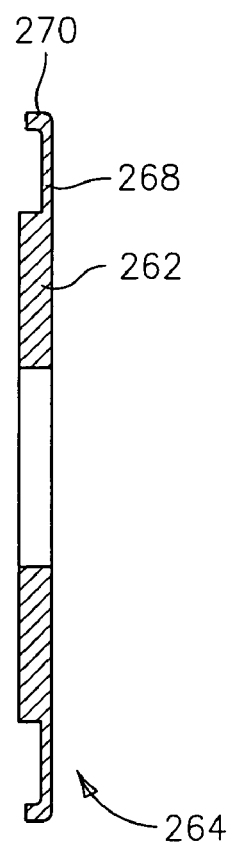
FIG. 5   FIG. 6

METHOD AND APPARATUS FOR CONTAMINATION PROTECTION FOR BEARING ASSEMBLY

TECHNICAL FIELD

This application relates generally to contamination protection of bearing assemblies. More specifically, this application relates to a method and apparatus for contamination protection of ball or roller bearings, for example, in rotating electrical machines, especially dynamoelectric machines such as automotive alternators (generators).

BACKGROUND

Rotating electrical machines such as automotive alternators (dynamoelectric machines) (also commonly referred to as "generators") having a stator secured within the housing of the machine and a rotor assembly that extends axially through the motor or generator are well known. The housing often includes two spaced apart frames which provide the main structural elements of the alternator. The frame closest to a pulley, which powers the alternator via a belt drive is commonly referred to as the drive end frame. The opposite frame is commonly referred to as the slip ring end frame. The two frames support between them the rotor assembly comprising a rotor shaft with a connected rotor winding. Support bearings for the rotor assembly are typically positioned "inboard" of the pulley that turns the rotor of the generator via a fan belt from the engine, the pulley also being attached to the rotor assembly. The frames are held together typically by three or four bolts which are attached axially between ears or bosses on the outside of the frames.

Each frame has a hub. The hub includes an inner core having a central axial opening (sometimes referred to as the bearing bore). The inner core axial opening provides mounting support for an outer race of a roller or ball bearing which mounts the rotor shaft to the hub. The outer race of the bearing is typically press fitted within this central opening of the core. Extending radially outward from the core is a series of hub ribs forming ventilation openings between contiguous hub ribs. The hub ribs connect the core with a rim of the hub.

Mounted on the shaft of the rotor in a position adjacent to the hub will be a fan. During operation of the alternator fan blades pass close by the hub ribs, essentially shearing the air as the blades pass near the hub ribs.

Presently, bearings that support the rotor assembly are exposed to the elements subjecting them to contamination, thus reducing the life of the bearings and the pulley. Present technology depends on one of two items for protection from contamination: the pulley or an external/outboard drive end fan.

Dual internal fan (DIF) alternators are especially susceptible to contamination of the drive end ball bearing because the ball bearing is placed in a location that is more exposed to the elements compared to prior art alternators. This is aggravated further by the large variation in customer pulleys that are often used in alternators. In particular, smaller diameter pulleys increase exposure of the drive end bearing to contamination.

Accordingly, contamination protection for the drive end bearing is desired that provides unrivalled protection with no sensitivity to the pulley used by the end-user.

BRIEF SUMMARY OF THE INVENTION

The above discussed and other drawbacks and deficiencies are overcome or alleviated by a bearing assembly that includes a bearing housing; a rotatable shaft extending through the bearing housing; a bearing having an outer race and an inner race with a bearing seal therebetween, the outer race operably coupled to the bearing housing and the inner race operably coupled to the rotatable shaft; and a slinger operably coupled to an outside edge defining the inner race and rotatable therewith while an external periphery defining the slinger is disposed within a groove configured in the housing, wherein the slinger protects the bearing from contamination from the elements while freely spinning absent contact with the housing, the outer race, and the bearing seal.

In another embodiment, a rotating electrical machine is disclosed. The rotating electrical machine includes a rotor rotatable about a rotor shaft; a fan operably connected to the rotor shaft; a stator surrounding the rotor; front and rear frames rotatably supporting the rotor, at least one of the frames having a hub with a core with an opening for receiving a bearing mounting the rotor with the hub, the bearing having an outer race and an inner race with a bearing seal therebetween, the outer race operably coupled to the hub and the inner race operably coupled to the rotor shaft; and a slinger operably coupled to an outside edge defining the inner race and rotatable therewith while an external periphery defining the slinger is disposed within a groove configured in the hub, wherein the slinger protects the bearing from contamination from the elements while freely spinning absent contact with the hub, the outer race, and the bearing seal.

In yet another embodiment, a method to suppress contamination of a bearing assembly in a brush type rotor of a wound-field electrical machine is disclosed. The method includes configuring a groove in a bearing housing having a rotatable shaft extending therethrough via a bearing, the bearing having an outer race and an inner race with a bearing seal therebetween, the outer race operably coupled to the bearing housing and the inner race operably coupled to the rotatable shaft; and operably coupling a slinger to an outside edge defining the inner race and rotatable therewith while an external periphery defining the slinger is disposed within a groove configured in the housing, wherein the slinger protects the bearing from contamination from the elements while freely spinning absent contact with the housing, the outer race, and the bearing seal.

BRIEF DESCRIPTION OF THE DRAWINGS

FIG. 3 is a front elevation view of a slinger used in the contamination protection apparatus of FIGS. 1 and 2;

FIG. 4 is a side elevation view of the slinger of FIG. 3

FIG. 5 is a cross section view of a spacer having a slinger integrally molded thereto in accordance with an exemplary alternative embodiment; and FIG. 6 is a cross section view of a cast integral spacer and slinger in accordance with another exemplary alternative embodiment.

DESCRIPTION OF THE PREFERRED EMBODIMENT

This disclosure relates to a method and apparatus for contamination protection of a bearing, and more particularly, to a slinger mounted on the rotor of a wound-field electrical machine and proximate a drive end bearing to limit exposure of the elements to the drive end bearing. The slinger significantly reduces contamination of the drive end bearing with no sensitivity to a pulley used by the end-user. In particular, the slinger is in operable contact with the rotor shaft and inner race of the drive end bearing, as well as being rotatable therewith to which it is attached, while the outer race and bearing housing are stationary and remain out of contact with the slinger.

The present method and apparatus for contamination protection of a bearing provides an improvement over previous designs in that it includes features from the rotating members (e.g., spacer(s) and/or slinger(s)) working in conjunction with features of the stationary member(s) to provide more effective protection to the bearing than can be accomplished by either a flat rotating spacer and/or slinger, or features of the stationary members. In addition to the synergy described above, the disclosure includes making use of a shallow-draw lip design to significantly increase the level of protection by lengthening the distance contaminants must travel to affect the bearing, as well as forcing contaminants to make several direction changes in order to come in proximity with the seal of the bearing.

Figure 1:
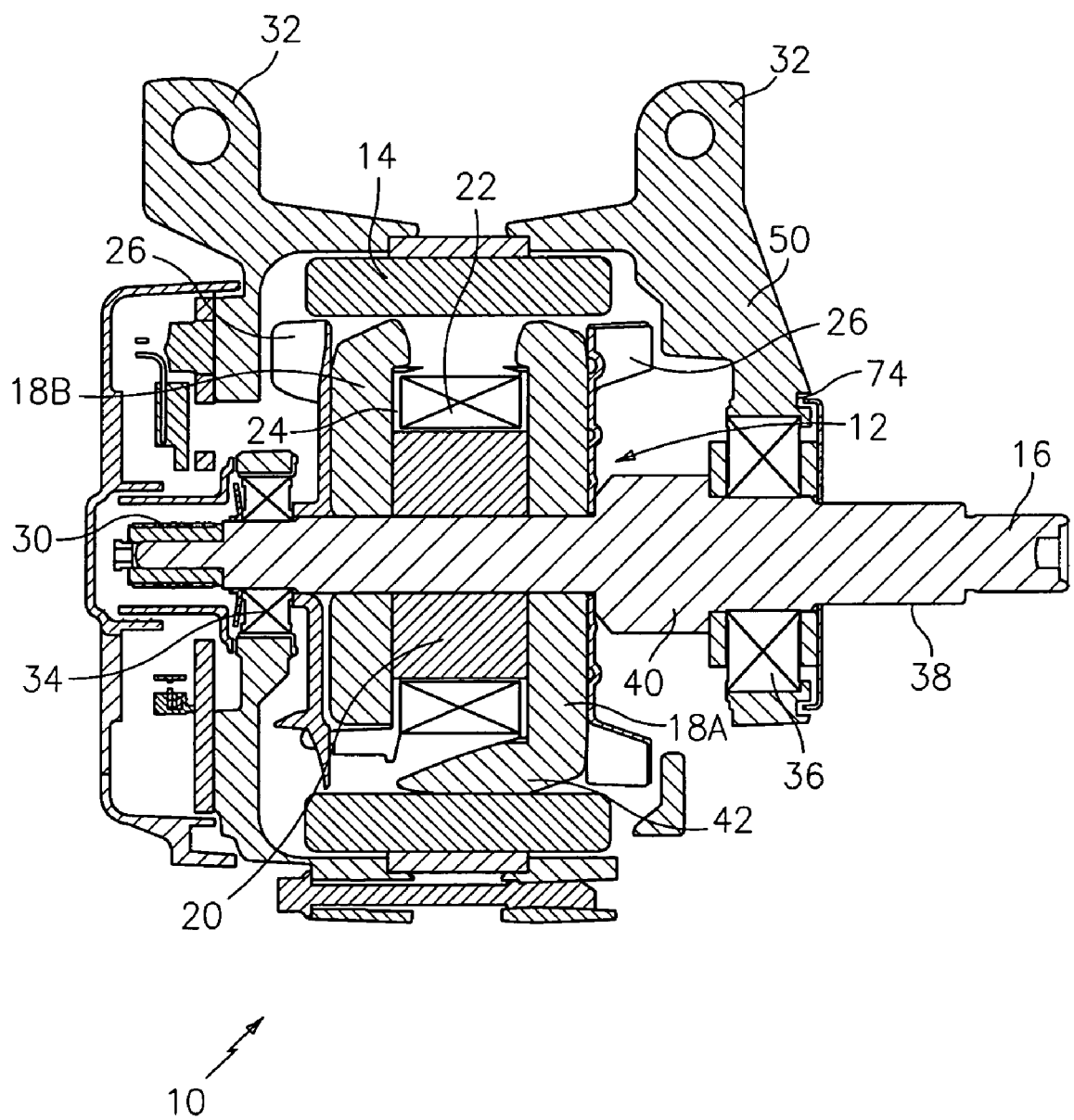
FIG. 1 is a cross sectional view through a Lundell alternator illustrating a contamination protection apparatus operably coupled to a drive end bearing assembly in accordance with an exemplary embodiment.

Referring now to FIG. 1, an alternator 10 has a rotor assembly generally designated by the reference numeral 12 and stator assembly generally designated by the reference numeral 14. The rotor assembly 12 includes a shaft 16 supporting all rotating magnetic circuit structures thereof including conventional pole-members or segments 18A and 18B, rotor core 20 and field coil 22 wound upon bobbin 24. Each segment 18A and 18B has P/2 claw poles where P is an even number and representative of the total number of poles. Additionally, all other non-magnetic circuit rotating structures are carried thereby, including air circulation fans 26 located at axially opposite sides of the pole-members, and a slip ring assembly 30 located at one extreme end of the shaft. One fan 26 is formed from sheet metal stock and spot welded to pole-member 18B while the other fan 26 is formed from an appropriate thermoplastic material and heat staked to tower extensions (not shown) from the field coil bobbin 24. However, it will be recognized that fans 26 may be formed and attached in various other ways and is not limited to those discussed above. The shaft 16 in turn is rotatably supported within a housing 32 by a pair of bearings 34, 36. Bearing 34 is a slip ring end bearing located between the slip ring assembly 30 and the fan 26. Bearing 36 is a drive end bearing located between a pulley section 38 on shaft 16 and a drive end shoulder 40 on shat 16.

As described above, the rotor assembly 12 is constituted by: the field winding 22 for generating a magnetic flux on passage of an electric current; and pole cores or segments 18A and 18B disposed so as to cover the field winding 22, magnetic poles being formed in the segments 18A and 18B by the magnetic flux generated by the field winding 22. The segments 18A and 18B are preferably made of iron, having two first and second claw-shaped magnetic poles (only one shown) disposed on an outer circumferential edge and offsetly aligned with each other in a circumferential direction so as to project axially, and the end segment pole cores 42 are fixed to the shaft 16 facing each other such that the claw pole of one core is aligned with a gap defined between contiguous claw poles of the other core and intermesh with the opposing magnetic poles of the other core as is well known in the art of Lundell rotor assemblies.

In the dynamoelectric machine 10 constructed in this manner, an electric current is supplied to the field winding 22 during start up from a storage battery through brushes (both not shown) and the slip rings 30, generating a magnetic flux. After the alternator turns on and begins to produce power, the alternator internally provides the field current. The first claw-shaped magnetic poles 42 of segment 18A are magnetized into a fixed polarity by this magnetic flux (such as North seeking (N) poles), and the second claw-shaped magnetic poles 42 (not shown) of segment 18B are magnetized into the opposite polarity (such as South-seeking (S) poles). At the same time, rotational torque from the engine is transmitted to the shaft 16, by means of the belt (not shown) and the pulley (not shown), rotating the rotor assembly 12. Thus, a rotating magnetic field is imparted to the armature winding (not shown) of stator assembly 14, inducing a voltage across the armature winding. An alternating-current electromotive force from induced voltage across armature winding passes through a rectifier and is converted into direct current, the magnitude thereof is adjusted by a voltage regulator, the storage battery is charged, and the current is supplied to an electrical load (all not shown).

Figure 2:
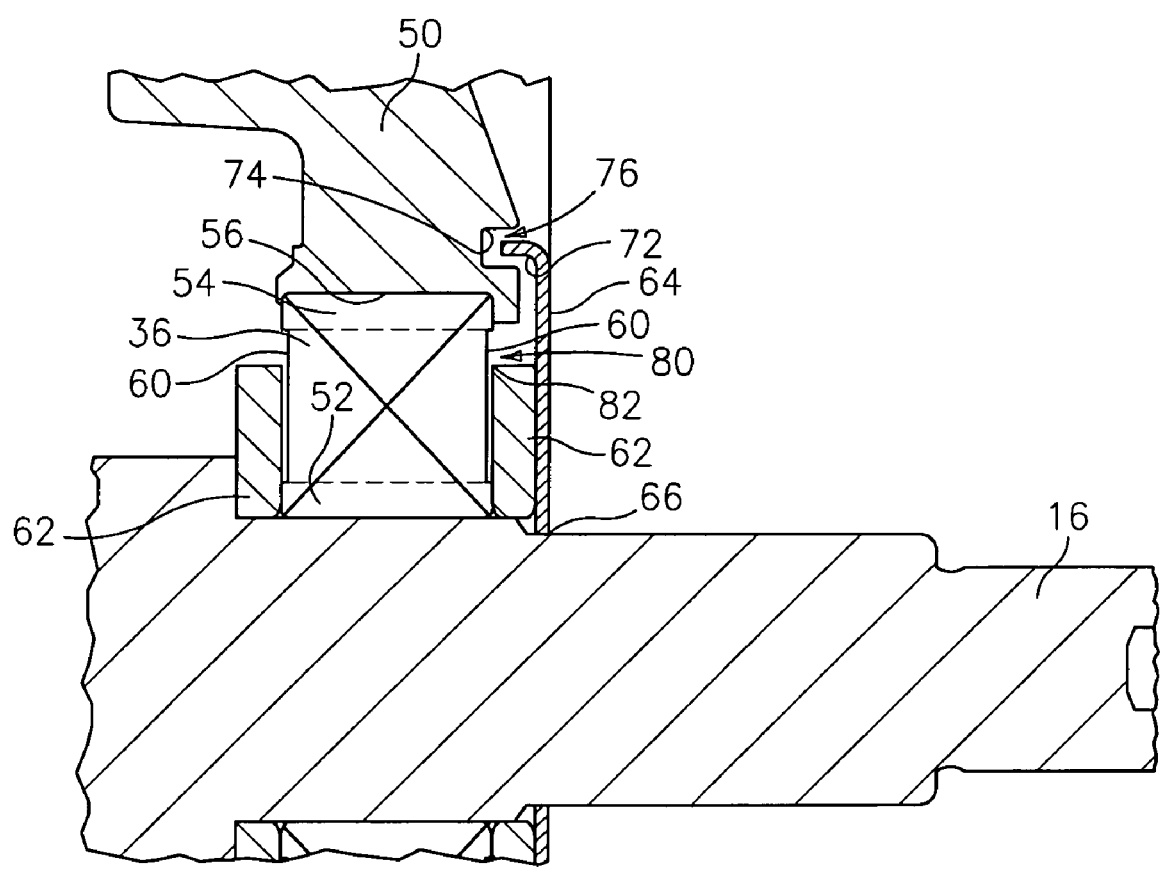
FIG. 2 is an enlarged partial cross sectional view of the drive end bearing assembly of FIG. 1 in accordance with an exemplary embodiment.

Referring now to FIGS. 1 and 2, support and sealing of rotor shaft 16 at the drive end frame 50 of housing 32 will be described in more detail. Drive end bearing 36 includes an inner race 52 fitted to shaft 16 and an outer race 54 is fitted at a core opening 56 defined by drive end frame 50. A ball or roller bearing, for example, is disposed between inner and outer races 52, 54, respectively, allowing shaft 16 to rotate with respect to stationary frame 50. A pair of opposing seals 60 may be included to further seal the ball or roller bearing between inner and outer races 52, 54, respectively.

In an exemplary embodiment, a flat washer or spacer 62 can be used to protect the seal 60 on bearing 36 on one, or both sides thereof. Each spacer 62 abuts the inner race 52 but remains out of contact with a respective seal 60. Each spacer 62 extends radially outwardly a distance shy of the outer race to avoid contact therewith, as each spacer 60 rotates with shaft 16 and inner race 52 while outer race 54 remains stationary along with frame 50.

Referring now to FIGS. 1–4, a metallic slinger 64 is used on one or both sides of bearing 36 to offer additional protection over that of spacers 62. In an exemplary embodiment as illustrated, slinger 64 is shaped like a Frisbee or is shaped like a saucer having a centrally located aperture 66 for shaft 16 to be disposed therethrough. Slingers are cupped pieces of sheet metal that may be used to act as oil filters and also to keep dirt and other contaminants from getting into a bearing.

Slinger 64 is defined by a first member 68 having a second member 70 extending from a terminal end defining first member 68. An opposite terminal end of first member 68 defines aperture 66. First member 68 is disc shaped such that one surface thereof abuts a corresponding spacer 62. Second member 70 extends from first member 68 forming a bight 72. Second member 70 defines a "rim" portion or flange that rotates within a complimentary configured groove 74 machined or cast into the bearing housing 32 illustrated as drive end frame 50 in FIGS. 1 and 2. Groove 74 is configured in the bearing's housing or retainer, without making contact, and prevents contaminants from getting to the bearing seal 60.

Second member 70 and groove 74 cooperate in defining a tortuous path 76 to provide an effective contamination protection to bearing 36 as best seen in FIG. 2. Path 76 delimits a labyrinth seal arrangement defined by groove 74 in housing 32 and the rotatable second member 70 that rotates as a unit with shaft 16. Use of a shallow-draw lip design of slinger 64 in conjunction with groove 74 significantly increases the level of protection by lengthening the distance contaminants must travel via path 76 to affect the bearing, as well as forcing contaminants to make several direction changes in order to come in proximity with seal 60 of bearing 36. In particular, one embodiment of path 76 is a serpentine path 76 which includes a plurality of 90° bends whereby a liquid contaminant, for example, is caused to make abrupt direction changes.

In an exemplary embodiment as illustrated in FIG. 2, it can be seen that spacer 62 provides a second serpentine path 80 which adds another 90° bend generally indicated at 82, whereby a liquid contaminant, for example, is caused to make another abrupt direction change. Use of a flat spacer 62 provides close-up protection to bearing 36 from contaminants such as dust, and liquid contaminants, for example. The shallow-draw lip 70 of slinger 64 provides significant additional protection from contaminants in cooperation with the cast-in or machined groove 74 in the non-rotating member(s), which makes a significant improvement in the protection from contaminants, including liquid from high-pressure washers, which may be directed at the bearing area.

In one embodiment, it should be noted that is envisioned that the contamination protection device disclosed herein uses stamped components (e.g., spacer 62 and slinger 64) working in conjunction with cast-in or machined features (e.g., grooves) to provide effective contamination protection to a ball bearing or roller bearing, including other types of bearing assemblies. In other embodiments referring to FIGS. 5 and 6, it is contemplated that spacer 62 and slinger 64 are integral.

FIG. 5 illustrates a slinger 164 comprising a metallic spacer 162 like spacer 62 having a second member 170 and a first member 168 molded thereto forming a slinger portion 172. Second member 170 and first member 168 correspond with second member 70 and a portion of first member 68, respectively, in FIG. 4. It is contemplated that slinger portion 172 may be a polymer (e.g., plastic) inserted molded with spacer 162, but is not limited thereto.

FIG. 6 illustrates a slinger 264 comprising an integrally cast metallic spacer 262 like spacer 62 having a second member 270 and a first member 268 integrally cast with spacer 262. Second member 270 and first member 268 correspond with second member 70 and a portion of first member 68, respectively, in FIG. 4.

The disclosure specifically covers the use of such components and features to protect the drive end bearing of an automotive alternator, but generally includes the use in any application where a sealed or shielded bearing is used in a severe contamination environment. While incorporation of the exemplary contamination protection device at a drive end frame has been described for use with generators associated with vehicles, the same may also be used and incorporated in applications other than generators for a vehicle where suppression or reduction of contamination in a bearing assembly is desired.

The slinger 64 and/or spacer 62 may be used to protect one, or both sides of a bearing. The bearing being protected will generally be a double seal design, but significant improvements in contamination protection will be achieved when used on any type of bearing, with or without bearing seals or shields.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A bearing assembly comprising:
   a bearing housing;
   a rotatable shaft extending through the bearing housing;
   a bearing having an outer race and an inner race with a bearing seal therebetween, the outer race operably coupled to the bearing housing and the inner race operably coupled to the rotatable shaft;
   a slinger operably coupled to an outside edge defining the inner race and rotatable therewith while an external periphery defining the slinger is disposed within a groove configured in the housing, wherein the slinger protects the bearing from contamination from the elements while freely spinning absent contact with the housing, the outer race, and the bearing seal; and
   a first spacer intermediate the outside edge defining the inner race and the slinger.

2. The bearing assembly of claim 1, wherein a second spacer is disposed intermediate a shoulder defined by the shaft and an opposite outside edge defining the inner race.

3. The bearing assembly of claim 2, wherein use of at least one of the first and second spacers provides a path more tortuous for entering contaminants than a tortuous path created by using the slinger alone.

4. The bearing assembly of claim 1, wherein a tortuous path created by the slinger and groove lengthens a distance entering contaminants must travel to affect the bearing.

5. The bearing assembly of claim 1, wherein the slinger in combination with the groove forces entering contaminants to make several direction changes in order to come in proximity with one of a seal and shield of the bearing.

6. The bearing assembly of claim 1, wherein the first spacer and slinger are integral, the spacer defining a first member having an aperture sized to fit the shaft and the slinger defining a second member extending from a periphery of the first member, the second member extending into the groove defining a tortuous path while allowing free translation of the second member within the groove avoiding contact therewith.

7. The bearing assembly of claim 1, wherein the slinger is a cupped piece of sheet metal defined by a first member having an aperture sized to fit the shaft and a second member extending from a periphery of the first member, the second member extending into the groove defining a tortuous path while allowing free translation of the second member within the groove avoiding contact therewith.

8. A rotating electrical machine comprising:
   a rotor rotatable about a rotor shaft;
   a fan operably connected to the rotor shaft;
   a stator surrounding the rotor;
   front and rear frames rotatably supporting the rotor, at least one of the frames having a hub with a core with an opening for receiving a bearing mounting the rotor with the hub, the bearing having an outer race and an inner race with a bearing seal therebetween, the outer race operably coupled to the hub and the inner race operably coupled to the rotor shaft;

a slinger operably coupled to an outside edge defining the inner race and rotatable therewith while an external periphery defining the slinger is disposed within a groove configured in the hub, wherein the slinger protects the bearing from contamination the elements while freely spinning absent contact with the hub, the outer race, and the bearing seal; and a first spacer intermediate the outside edge defining the inner race and the slinger.

9. The rotating electrical machine of claim 8, wherein the machine is a dynamo-electrical machine for powering a vehicle and the frame is adjacent a pulley which is fixably connected to the rotor and powers the rotor.

10. The rotating electrical machine of claim 8, wherein a second spacer is disposed intermediate a shoulder defined by the shaft and an opposite outside edge defining the inner race.

11. The rotating electrical machine of claim 10, wherein use of at least one of the first and second spacers provides a path more tortuous for entering contaminants than a tortuous path created by using the slinger alone.

12. The rotating electrical machine of claim 8, wherein a tortuous path created by the slinger and groove lengthens a distance entering contaminants must travel to affect the bearing.

13. The rotating electrical machine of claim 8, wherein the slinger in combination with the groove forces entering contaminants to make several direction changes in order to come in proximity with one of a seal and shield of the bearing.

14. The rotating electrical machine of claim 8, wherein the slinger is a cupped piece of sheet metal defined by a flat member having an aperture sized to fit the shaft and a second member extending from a periphery of the first member, the second member extending into the groove defining a tortuous path while allowing free translation of the second member within the groove avoiding contact therewith.

15. A method to suppress contamination of a bearing assembly in a brush type rotor of a wound-field electrical machine, the method comprising:

configuring a groove in a bearing housing having a rotatable shaft extending therethrough via a bearing, the bearing having an outer race and an inner race with a bearing seal therebetween, the outer race operably coupled to the bearing housing and the inner race operably coupled to the rotatable shaft;

operably Coupling a slinger to an outside edge defining the inner race and rotatable therewith while an external periphery defining the slinger is disposed within a groove configured in the housing, wherein the slinger protects the bearing from contamination from the elements while freely spinning absent contact with the housing, the outer race, and the bearing seal; and disposing a first spacer intermediate the outside edge defining the inner race and the slinger.

16. The method of claim 15, wherein the groove is one of cast-in and machined in the bearing housing.

17. The method of claim 15, further comprising:

disposing a second spacer intermediate a shoulder defined by the shaft and an opposite outside edge defining the inner race.

* * * * *